Dec. 30, 1952 — G. A. M. GAMET ET AL — 2,623,775
HANDLING DEVICE
Filed July 23, 1949 — 3 Sheets-Sheet 1
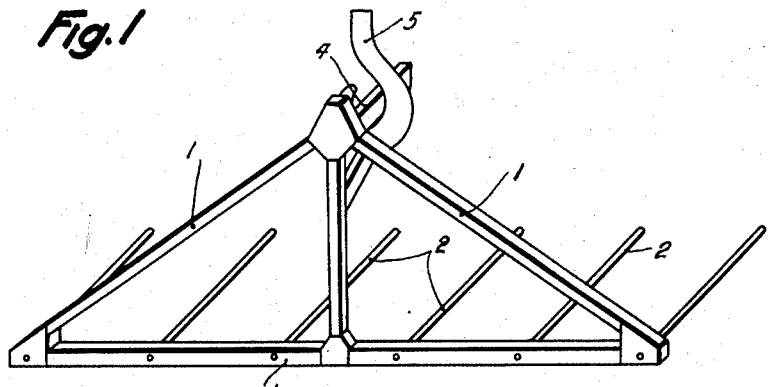
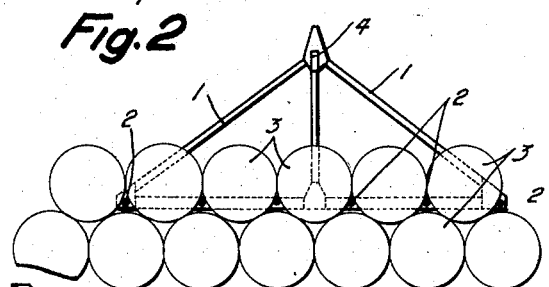
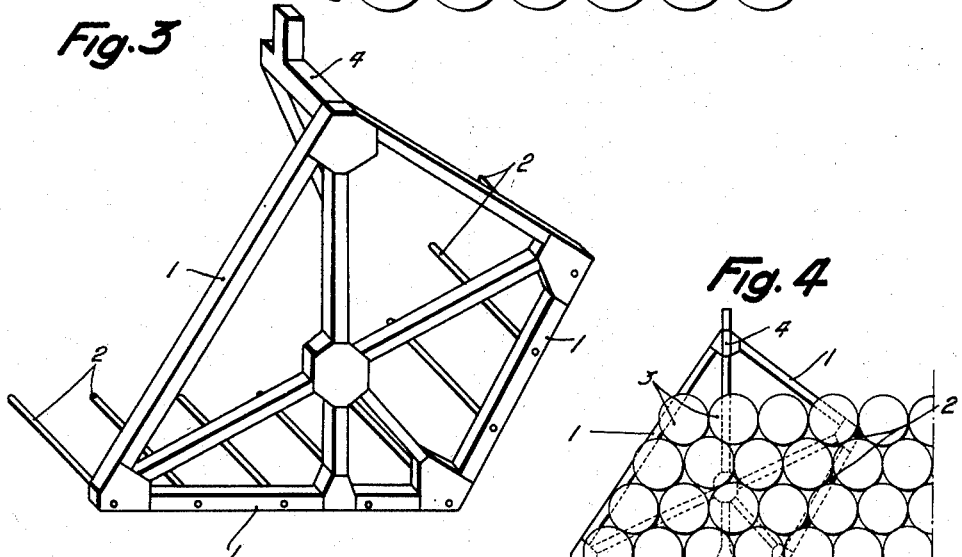
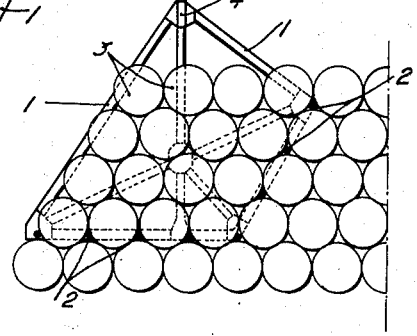
INVENTOR.
GÉRARD AUGUSTIN MAURICE GAMET,
AND LUCIEN JOSEPH HENRI BROMET,
ATTORNEYS.

Dec. 30, 1952  G. A. M. GAMET ET AL  2,623,775
HANDLING DEVICE
Filed July 23, 1949  3 Sheets-Sheet 2

INVENTORS.
GÉRARD AUGUSTIN MAURICE GAMET,
AND LUCIEN JOSEPH HENRI BROMET,

ATTORNEYS.

Dec. 30, 1952  G. A. M. GAMET ET AL  2,623,775
HANDLING DEVICE

Filed July 23, 1949  3 Sheets-Sheet 3

INVENTOR.
GÉRARD AUGUSTIN MAURICE GAMET,
AND LUCIEN JOSEPH HENRI BROMET,

ATTORNEYS.

Patented Dec. 30, 1952

2,623,775

UNITED STATES PATENT OFFICE 2,623,775

HANDLING DEVICE

Gérard Augustin Maurice Gamet, Paris, and Lucien Joseph Henri Bromet, Les Clavaux, par Gavet, France, assignors of two-thirds to Compagnie Universelle d'Acetylene et d'Electro-Metallurgie, Paris, France, a corporation of France Application July 23, 1949, Serial No. 106,378
In France January 19, 1949

1 Claim. (Cl. 294—67)

An object of the present invention is to provide a handling device for easily handling or transporting, for example, articles regularly inscribed within a surface of revolution, cylindrical or partly cylindrical articles, such as barrels, cans, bottles, tins, casks or the like, said articles having the same size, being in any quantity and being so arranged that their axes are substantially horizontal. Such articles are generally stacked in superposed and staggered layers, the articles of each layer being so juxtaposed that their spacing is equal to their maximum diameter.

Another object of the present invention is to provide a handling device which makes it possible to handle vertically arranged articles provided that said articles project sufficiently or that their upper portion is wider or again that they are not exactly cylindrical. It is thus possible to transport easily carboys, pouring vessels, barrels, ingot moulds, packing cases, cans, containers, various framed articles or the like.

The device according to the present invention is constituted by a frame on which are secured substantially at right-angle to said frame, aligned fingers the spacing of which is preferably adjustable, said frame being provided with means whereby it may be secured, for example, to a hook.

The securing means are preferably such that when the device is loaded but not suspended, the vertical line from the fastening point passes through the center of gravity of the whole assembly.

If the articles are to be transported horizontally and if they are juxtaposed, the length of the fingers is preferably equal to at least half that of the articles to be transported and the spacing of said fingers is so adjusted that it becomes equal to the maximum diameter of said articles. The fingers may be arranged along one single line. In this case, the device makes it possible to handle articles from one or more layers, the outline or cross section of the whole assembly constituting a triangle or a trapezium. The fingers may also be arranged in two lines comprising between them an angle of 120°. In this case, several layers of articles may be transported, the cross section of the whole assembly constituting a parallelogram.

When the articles are to be transported in a vertical position, the fingers may be arranged on the frame in pairs, the spacing of the fingers of each pair being smaller than the maximum dimension of the articles in a plane perpendicular to that of the fingers, i. e. than the maximum diameter when the articles are bodies of revolution.

The cross and longitudinal sections of the fingers may be so adapted that they assume exactly the shape of the articles to be supported thereby. The equilibrium of the articles is thus ensured and any rolling of the articles which would otherwise be possible is thus avoided. The fingers may therefore have a circular, ovoidal, triangular, square, rectangular, T-, U-, etc. cross section. They may also be provided with recessed portions intended to be used as a bearing for the transported articles and be made either of metal, coated or not with a layer of a suitable matter such as wood, or of any other material.

The frame may be secured, if desired, to a lifting conveyor.

Some illustrative embodiments of the device according to the invention have been shown in the appended drawings.

In these drawings:

Fig. 1 is a perspective view of a first embodiment.

Fig. 2 is an end view of the same during loading, the articles to be transported being disposed horizontally;

Fig. 3 is a perspective view of a second embodiment;

Fig. 4 is an end view during loading, the articles to be transported being disposed horizontally;

Figure 5:
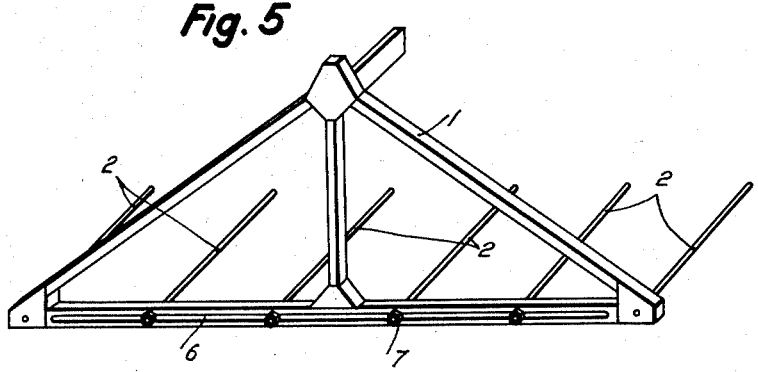
Fig. 5 is a perspective view of a third embodiment of the device.

The device shown in Figs. 1 and 2 is constituted by a frame 1 provided along its lower edge with six fingers 2 at right-angles to the frame. This device is adapted to transport articles 3, e. g. cylindrical articles, and the spacing of fingers 2 is equal to the diameter of the articles 3. The frame carries at its upper portion and in the normal median plane a bracket 4 which is used for suspending said frame. Said suspension may be effected by means of a hook 5 which is disposed at a distance from frame 1 substantially equal to half the length of articles 3. In this manner, the center of gravity of the whole assembly is located on the vertical line passing through the suspension point and when the loaded device is lifted, the plane of fingers 2 will remain horizontal.

For lifting articles 3, fingers 2 are introduced into the gaps between the articles of the upper layer and those of the next lower layer. It is thus possible to lift in one operation a number of articles equal to the number of fingers minus one unit, viz. five articles in the example shown.

In the device shown in Figs. 3 and 4, fingers 2 are arranged along two lines having between them an angle of 120°. The horizontal line comprises five fingers and the oblique line comprises four fingers, one finger being common to both lines. Bracket 4 is located in the plane normal to the frame and containing the centre of gravity of the loaded device. As shown in Fig. 4, it is possible to lift with this device a number of layers of articles equal to the number of fingers of the oblique line. The device shown makes it possible to lift sixteen articles.

Figure 6:
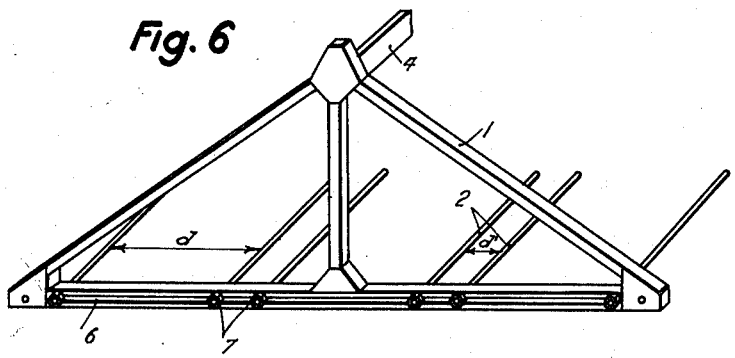
Fig. 6 is a perspective view of a fourth embodiment.

In the devices shown in Figs. 5 and 6, fingers 2 are secured in an adjustable and removable manner. The device may then handle articles of different sizes and it is not necessary to change the device when the articles to be transported or the size of said articles vary. The fingers terminate, for this purpose, in a threaded portion which enters into a slot 6 provided in the horizontal cross member of the frame and on which is screwed a nut 7. In the device of Fig. 6 said fingers are arranged pairwise and the spacing $d$ between the fingers of each pair is smaller than the maximum dimension of the articles to be transported in a plane at right angles to that of the fingers. If the articles are juxtaposed, which is the general case, spacing $d'$ is equal to said maximum dimension minus $d$. On the contrary, in the device of Fig. 5, the fingers are equally spaced from each other as in the device of Fig. 1.

Figure 9:
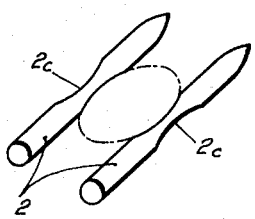
Fig. 9 is a perspective view of a finger.
Figure 7:
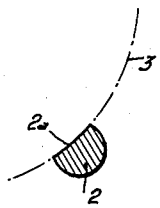
Fig. 7 is an enlarged cross section of one finger.
Figure 8:
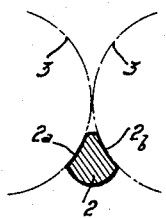
Fig. 8 is a view similar to Fig. 7 of an alternative embodiment.

The cross section of fingers 2 may have any shape, e. g. a round one. However, in certain cases, the fingers may advantageously be provided with a longitudinal notch $2a$ (Fig. 7) so as to assume closely the shape of the articles 3 which are to be supported by said fingers. If the device is similar to that of Fig. 1 or Fig. 5, i. e. if the spacing between the fingers is equal to the maximum dimension of the articles to be transported, said fingers should be provided with two symmetrical longitudinal notches $2a$ and $2b$ (Fig. 8). The longitudinal section of fingers 2 may be also adapted to the articles to be transported as shown at $2c$ in Fig. 9.

Figure 12:
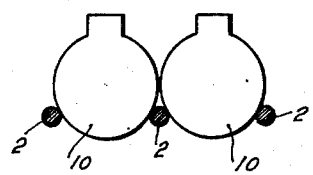
Figure 13:
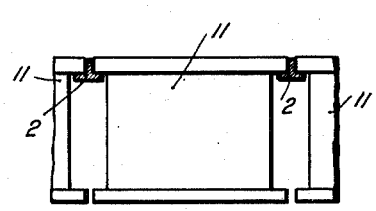

The device according to the invention, e. g. that of Fig. 1, may be used for transporting in a vertical position, e. g. vessels 8 (Fig. 10) ingot moulds 9 (Fig. 11), carboys 10 (Fig. 12) or packing cases 11 (Fig. 13).

Figure 10:
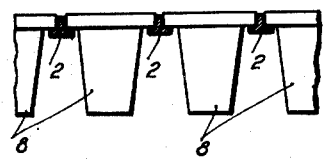
Figs. 10 to 13 show how several different articles may be transported in a vertical position with a device of the type shown in Figs. 1 or 5.
Figure 11:
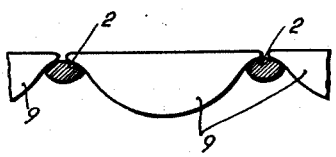

In Figs. 10 and 13, the fingers have been shown with an inverted T-cross-section which is particularly well adapted to the transport of articles having a right-angled projection; in Fig. 11, the fingers have an ovoidal cross-section in order to be able to fit the incurved shape of the ingot moulds; in Fig. 12, the fingers have a circular cross-section.

Figure 19:
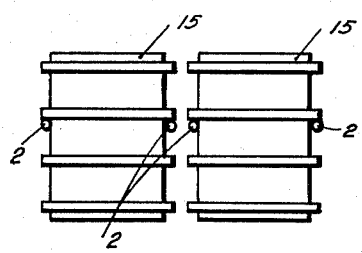
Figs. 14 to 19 show how several different articles may be transported in a vertical position with a device of the type shown in Fig. 6.
Figure 14:
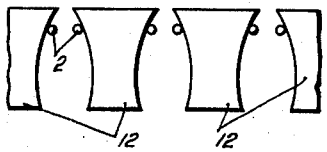
Figure 15:
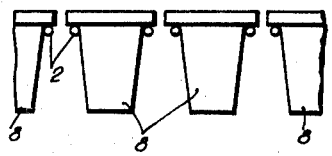
Figure 16:
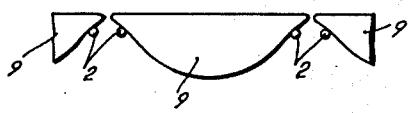
Figure 17:
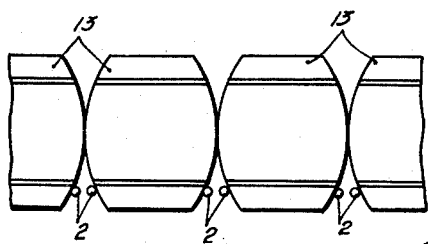
Figure 18:
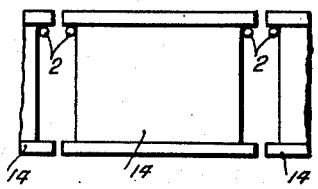

Similarly, the device of Fig. 6 permits of the handling in a vertical position, e. g. pouring vessels 12 (Fig. 14), vessels 8, (Fig. 15), ingot moulds 9 (Fig. 16), barrels 13 (Fig. 17), packing cases 14 (Fig. 18) or oil barrels 15 (Fig. 19).

It will be understood that the device according to the invention makes it possible to transport very quickly and simultaneously a great number of articles. This results in an important saving in labor, and a great speed of handling.

What we claim is:

A device for handling elongated articles of uniform and symmetrical cross section, comprising a frame having suspension means, and having a plurality of parallel fingers secured thereto in a common plane at right angles to the plane of said frame, and having a plurality of additional parallel fingers secured thereto in a second common plane at right angles to the plane of said frame and at an angle of 120° to said first mentioned common plane, the spacing between the axes of said fingers being equal to the maximum diameter of said elongated articles, and their length being at least equal to one-half the length of said articles.

GÉRARD AUGUSTIN MAURICE GAMET.
LUCIEN JOSEPH HENRI BROMET.

REFERENCES CITED

The following references are of record in the file of this patent:

UNITED STATES PATENTS

| Number | Name | Date |
|---|---|---|
| 642,796 | Jones | Feb. 6, 1900 |
| 732,884 | Normandin | July 7, 1903 |
| 2,239,135 | Wehr | Apr. 22, 1941 |
| 2,495,658 | Moseley | Jan. 25, 1950 |